United States Patent
Lowe et al.

(10) Patent No.: US 6,243,785 B1
(45) Date of Patent: *Jun. 5, 2001

(54) HARDWARE ASSISTED POLLING FOR SOFTWARE DRIVERS

(75) Inventors: Glen H. Lowe, Union City; Claude Hayek, Mountain View, both of CA (US)

(73) Assignee: 3COM Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,417

(22) Filed: May 20, 1998

(51) Int. Cl.[7] .................................................. G06F 13/00
(52) U.S. Cl. .......................... 710/260; 710/47; 710/48; 710/109
(58) Field of Search ..................................... 713/300–340; 710/260–269, 47, 48, 242, 109; 709/100

(56) References Cited

U.S. PATENT DOCUMENTS

| | | | |
|---|---|---|---|
| 5,046,039 | * 9/1991 | Ugajin et al. | 710/56 |
| 5,432,946 | * 7/1995 | Allard et al. | 713/310 |
| 5,530,874 | * 6/1996 | Emery et al. | 710/262 |
| 5,600,785 | * 2/1997 | Potter | 714/23 |
| 5,613,129 | * 3/1997 | Walsh | 710/267 |
| 5,623,677 | * 4/1997 | Townsley et al. | 713/310 |
| 5,659,758 | * 8/1997 | Gentry et al. | 710/260 |
| 5,708,814 | * 1/1998 | Short et al. | 710/260 |
| 5,717,870 | * 2/1998 | Dobson | 709/250 |
| 5,742,833 | * 4/1998 | Dea et al. | 713/323 |
| 5,758,171 | * 5/1998 | Ramamurthy et al. | 713/300 |
| 5,768,500 | * 6/1998 | Agrawal et al. | 714/47 |
| 5,881,296 | * 3/1999 | Williams et al. | 710/263 |
| 5,925,133 | * 7/1999 | Buxton et al. | 713/323 |
| 5,930,516 | * 7/1999 | Watt, Jr. et al. | 713/322 |
| 5,943,479 | * 8/1999 | Klein et al. | 709/212 |
| 5,954,820 | * 9/1999 | Hetzler | 713/323 |
| 5,966,546 | * 10/1999 | Thomas et al. | 395/868 |
| 5,983,275 | * 11/1999 | Ecclesine | 709/231 |
| 6,023,725 | * 2/2000 | Ozawa et al. | 709/219 |
| 6,085,277 | * 7/2000 | Nordstrom et al. | 710/263 |

* cited by examiner

Primary Examiner—Paul R. Myers
(74) Attorney, Agent, or Firm—Wagner, Murabito & Hao LLP (57) ABSTRACT

A method and system for programmably controlling hardware generation of interrupts by a peripheral component. In one embodiment, the present invention uses a peripheral component driver to programmably define a duration for a time cycle of a hardware timer disposed on a peripheral component. The hardware timer is configured to cause the generation of an interrupt signal upon the expiration of the time cycle. In this embodiment, the hardware timer of the peripheral component implements the duration for the time cycle and causes the generation of an interrupt signal upon the expiration of the time cycle. In so doing, the present embodiment attains the reliability and consistency of hardware timer generated interrupts schemes, but, by controlling the hardware timer with software, the present embodiment prevents over utilization of the CPU by the hardware timer.

22 Claims, 6 Drawing Sheets

HARDWARE ASSISTED POLLING FOR SOFTWARE DRIVERS

TECHNICAL FIELD

The present invention generally pertains to the field of computer networking. More particularly, the present invention is related to interrupt generation by a peripheral component.

BACKGROUND ART

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via e-mail and via video teleconferencing.

One popular type of computer network is known as a local area network (LAN). LANs connect multiple computers together such that the users of the computers can access the same information and share data. Typically, in order to be connected to a LAN, a general purpose computer requires an expansion board generally known as a network interface card (NIC). Essentially, the NIC works with the operating system and central processing unit (CPU) of the host computer to control the flow of information over the LAN. Some NICs may also be used to connect a computer to the Internet.

The NIC, like other hardware devices, requires a device driver which controls the physical functions of the NIC and coordinates data transfers between the NIC and the host operating system. An industry standard for interfacing between the device driver and the host operating system is known as the Network Device Interface Specification, or NDIS, which is developed by Microsoft Corporation of Redmond, Wash. The operating system layer implementing the NDIS interface is generally known as an NDIS wrapper. Functionally, the NDIS wrapper arbitrates the control of the device driver between various application programs and provides temporary storage for the data packets.

In one type of prior art system, the host operating system provides a software timer which attempts to fixedly set the rate at which the device driver will be instructed to check or "poll" the NIC to determine whether the NIC has any events to be serviced. Unfortunately, such conventional software timer approaches do not always provide for consistent and timely polling of the NIC. That is, if the operating system of the host computer is occupied with another task, the operating system can be delayed in instructing the device driver to poll the NIC. Specifically, polling of the NIC is sometimes delayed until after the operating system has completed its current task As a result, even though the software timer has been designed to have the NIC polled at a selected rate, the NIC may have wait longer than the selected time period for the polling to occur. Such an additional delay can compromise the performance characteristics of the NIC.

As yet another drawback to conventional software timer-based polling approaches, the software timer of the host operating system is typically only programmable to increments on the order of milliseconds (i.e. such prior art approaches have a "granularity" which is on the order of milliseconds). Hence, the greatest frequency with which the software timer can direct the device driver to poll the NIC is every few milliseconds. Although such a frequency may seem sufficient, under certain circumstances and in some applications, such millisecond polling frequency capability is not adequate for optimal NIC performance.

In another type of prior art system, in order for the NIC to communicate with or access the CPU, an interrupt must be generated. In such a prior art approach, hardware on the NIC generates an interrupt when the NIC has an event to be serviced. However, with the advent of high speed applications and environments such as, for example, Gigabit Ethernet or asynchronous transfer mode (ATM), data is being transferred from and arriving at the NIC at much higher rate. As a result, of the higher data transfer speeds, the generation of interrupts by the NIC becomes an increasingly critical operation parameter. In fact, conventional hardware based interrupt generation schemes could result in the NIC almost continuously asserting interrupts to the CPU of the host computer. Under such circumstances, CPU utilization becomes prohibitively excessive. That is, such prior art hardware generated interrupt approaches do not optimally minimize CPU utilization.

One conventional hardware generated interrupt approach has additional significant drawbacks associated therewith. Specifically, during typical operation, the NIC may experience periods of extremely heavy utilization (e.g. during transmission and reception of traffic bursts). Similarly, the NIC may experience periods of very light utilization (e.g. when little or no network traffic is occurring). Unfortunately, conventional hardware generated interrupt approaches, do not differentiate between periods of extremely heavy utilization and periods of very light utilization. Instead, a NIC employing such a conventional approach repeatedly generates an interrupt upon a hardware event such as, for example, receive FIFO not empty.

Thus, a need exists for a NIC which precisely and consistently generates interrupts at a predetermined frequency. A need also exists for a NIC which has the ability to generate interrupts with finer granularity than is possible with a conventional software approaches. Still another need exists for a network interface card (NIC) which meets the above-listed needs and which also generates interrupts in a manner which minimizes CPU utilization. Yet another need exists for a NIC meets the above-listed needs and which dynamically varies the frequency with which interrupts are generated.

DISCLOSURE OF THE INVENTION

The present invention provides a NIC which precisely and consistently generates interrupts at a predetermined frequency. The present invention also provides a NIC which has the ability to generate interrupts with finer granularity than is possible with a conventional software approaches. The present invention further provides a NIC which meets the above-listed needs and which also generates interrupts in a manner which minimizes CPU utilization. Additionally, the present invention provides a NIC attains the above-listed results and which dynamically varies the frequency with which interrupts are generated. The above accomplishments are achieved with a NIC having hardware-assisted, software-controlled, dynamic, interrupt generation capabilities.

Specifically, in one embodiment, the present invention uses a peripheral component driver to programmably define a duration for a time cycle of a hardware timer disposed on a peripheral component. The hardware timer is configured to cause the generation of an interrupt signal upon the expiration of the time cycle. In this embodiment, the hardware timer of the peripheral component implements the duration for the time cycle and causes the generation of an interrupt signal upon the expiration of the time cycle. In so doing, the present embodiment attains the reliability and consistency of hardware timer generated interrupts schemes, but, by controlling the hardware timer with software, the present embodiment prevents over utilization of the CPU by the hardware timer.

In another embodiment, the present invention includes the features of the above-listed embodiment and further recites having the peripheral component driver monitor activity of the peripheral component. In one such embodiment, the peripheral component driver then reprograms the duration for the time cycle of the hardware timer. The reprogramming of the time cycle of the hardware timer of the peripheral component is based upon the monitored activity of the peripheral component. In so doing the present embodiment, dynamically adjusts the frequency with which interrupts are generated by the hardware timer of the peripheral component based upon the activity and corresponding requirements of the peripheral component.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "monitoring", "reprogramming", "defining", "using" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Figure 1:
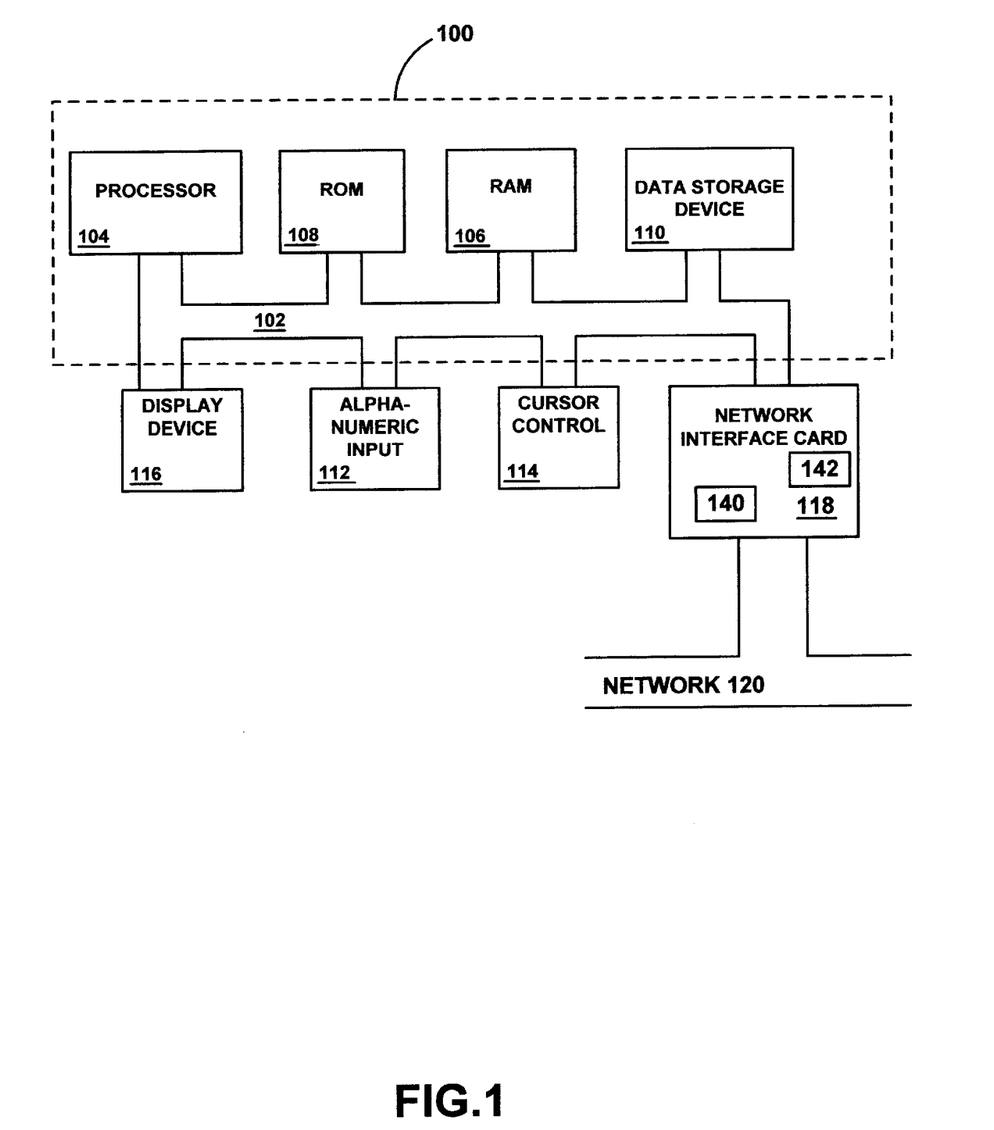
FIG. 1 is a schematic diagram of an exemplary computer system used to perform steps of the present hardware assisted polling for software drivers method in accordance with one embodiment of the present invention.

Computer System Environment of the Present Hardware Assisted Polling for Software Drivers Invention With reference now to FIG. 1, portions of the present hardware assisted polling for software drivers method and system are comprised of computer-readable and computer-executable instructions which reside, for example, in computer-usable media of a computer system. FIG. 1 illustrates an exemplary computer system 100 used to perform the hardware assisted polling for software drivers method in accordance with one embodiment of the present invention. It is appreciated that system 100 of FIG. 1 is exemplary only and that the present invention can operate within a number of different computer systems including general purpose networked computer systems, embedded computer systems, and stand alone computer systems.

System 100 of FIG. 1 includes an address/data bus 102 for communicating information, and a central processor unit 104 coupled to bus 102 for processing information and instructions. Central processor unit 104 may be an 80x86-family microprocessor. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112 including alphanumeric and function keys is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the hardware assisted polling for software drivers method and system embodiments of the present invention are found below.

With reference still to FIG. 1, significantly, a network interface card (NIC) 118 coupled to bus 102 is connected to a network 120 and controls the flow of information over network 120. Data packets, such as Ethernet packets, that are incoming arrive at NIC 118 via network 120 and are stored in FIFO memory 140 of NIC 118 before being transferred to other hardware and software of computer system 100. It will be understood, that NIC 118 is also well suited to transmitting data packets to network 120. NIC 118 of FIG. 1 further includes a hardware timer 142. A more detailed discussion of NIC 118 in furtherance of the present invention is found below.

Figure 2:
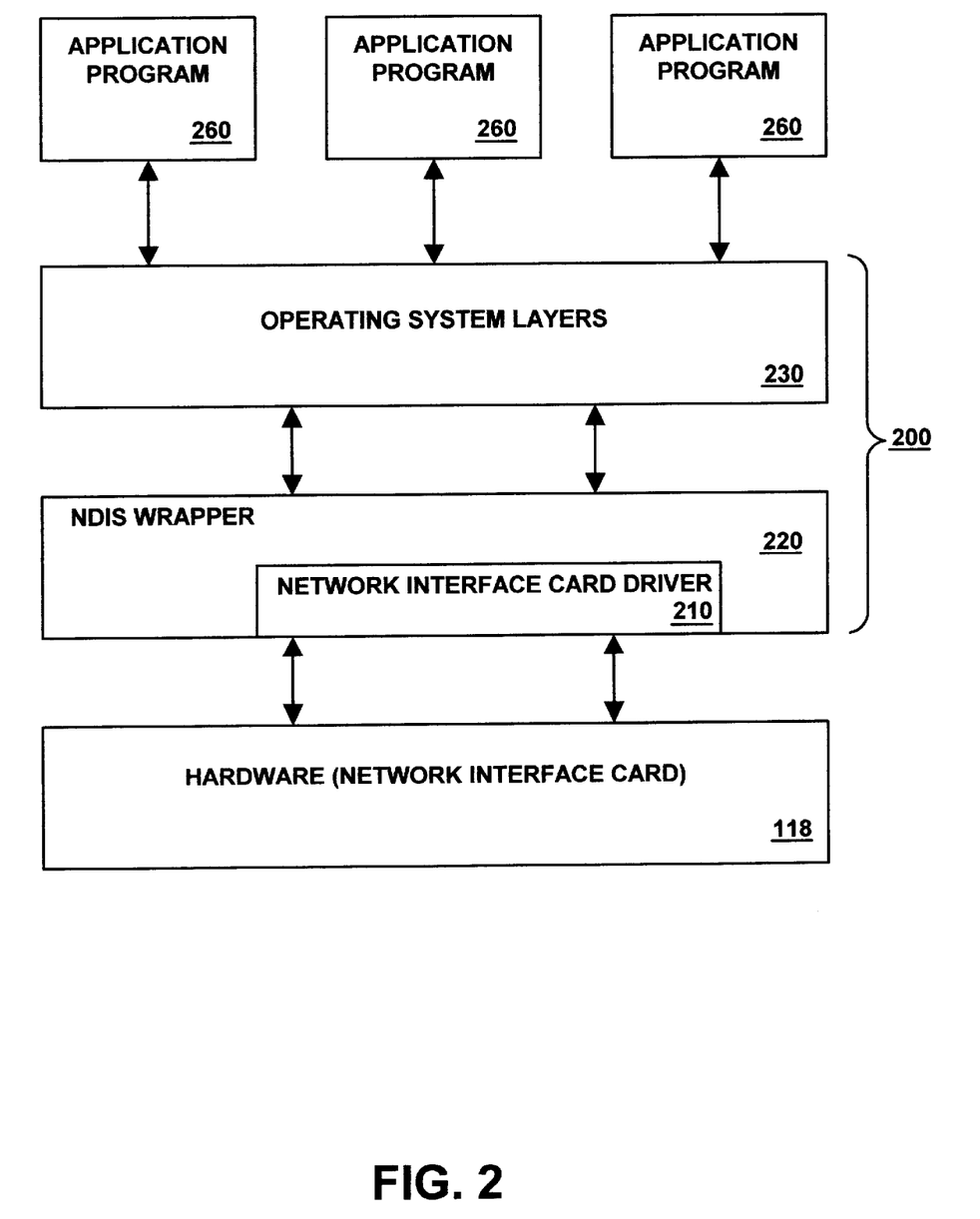
FIG. 2 is a schematic diagram of different operating layers associated with the computer system as illustrated in FIG. 1 in furtherance of one embodiment of the present invention.

Referring next to FIG. 2, a block diagram that represents the different layers of a host operating system 200 operable on computer system 100 of FIG. 1 is shown. Host operating system 200 includes a network interface card driver 210 that operates NIC 118 and moves data packets between NIC 118 and other hardware and software of computer system 100. Implemented directly above network interface card driver 210 is a network device interface specification (NDIS) wrapper 220. FIG. 2 further includes a schematic representation of operating system layers 230. NDIS wrapper 220 primarily arbitrates the control of network interface card driver 210 between various application programs, typically shown as 260.

Figure 3:
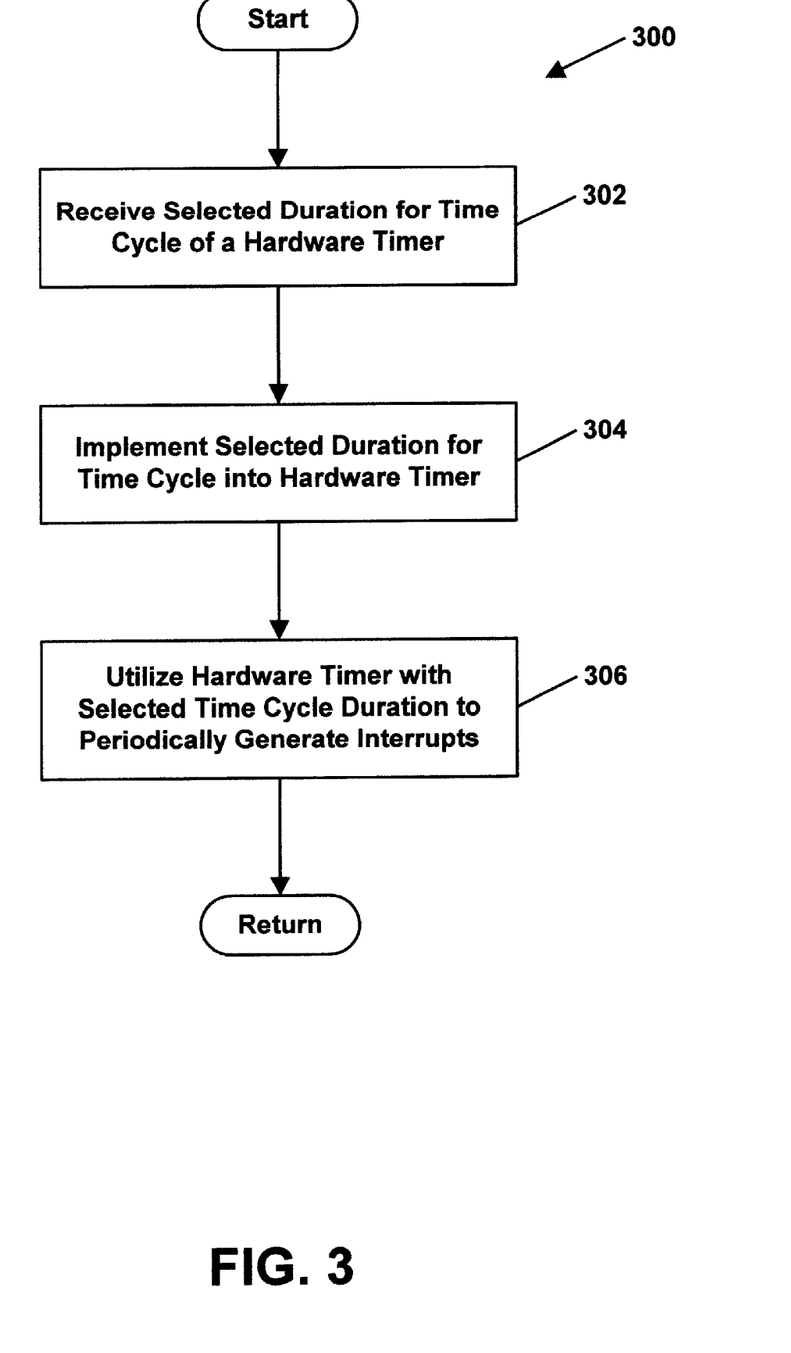
FIG. 3 is a flow chart of steps performed in one implementation of a hardware assisted polling for software drivers method in accordance with one embodiment of the present claimed invention.

General Description of the Present Hardware Assisted Polling for Software Driver Invention With reference next to FIG. 3, an flow chart 300 of exemplary steps used by the present invention is shown. Flow chart 300 includes processes of the present invention which, in one embodiment, are carried out by a processor under the control of computer-readable and computer-executable instructions. The computer-readable and computer-executable instructions reside, for example, in data storage features such as computer usable volatile memory 106 and/or computer usable non-volatile memory 108 of FIG. 1. The computer-readable and computer-executable instructions are used to control or operate in conjunction with, for example, central processing unit 104 of FIG. 1, host operating system 200, and network device driver 210 both of FIG. 2. Although specific steps are disclosed in flow chart 300 of FIG. 3, such steps are exemplary. That is, the present invention is well suited to performing various other steps or variations of the steps recited in FIG. 3.

In step 302 of FIG. 3, in one embodiment, peripheral component driver 210 of FIG. 2 receives a duration for the time cycle of a hardware timer. More specifically, peripheral component driver is adapted to programmably define a duration for a time cycle of a hardware timer 142 disposed on a peripheral component 118 both of FIG. 1. In the following description of embodiments of the present invention, the peripheral component driver is a network interface card driver. Additionally, in the following description of embodiments of the present invention, the peripheral component is a network interface card. Although the present embodiments specifically recite a network interface card and a network interface card driver, the present invention is also well suited to an embodiment employing various other peripheral components and peripheral component drivers. That is, the present invention is well suited to an embodiment in which the peripheral component is, for example, a PCMCIA (personal computer memory card international association) card and the peripheral component driver is a corresponding PCMCIA driver. Similarly, the present invention is well suited to an embodiment in which the peripheral component is, for example, a compact form factor I/O (input/output) card and the peripheral component driver is a corresponding compact form factor I/O driver.

Figure 4:
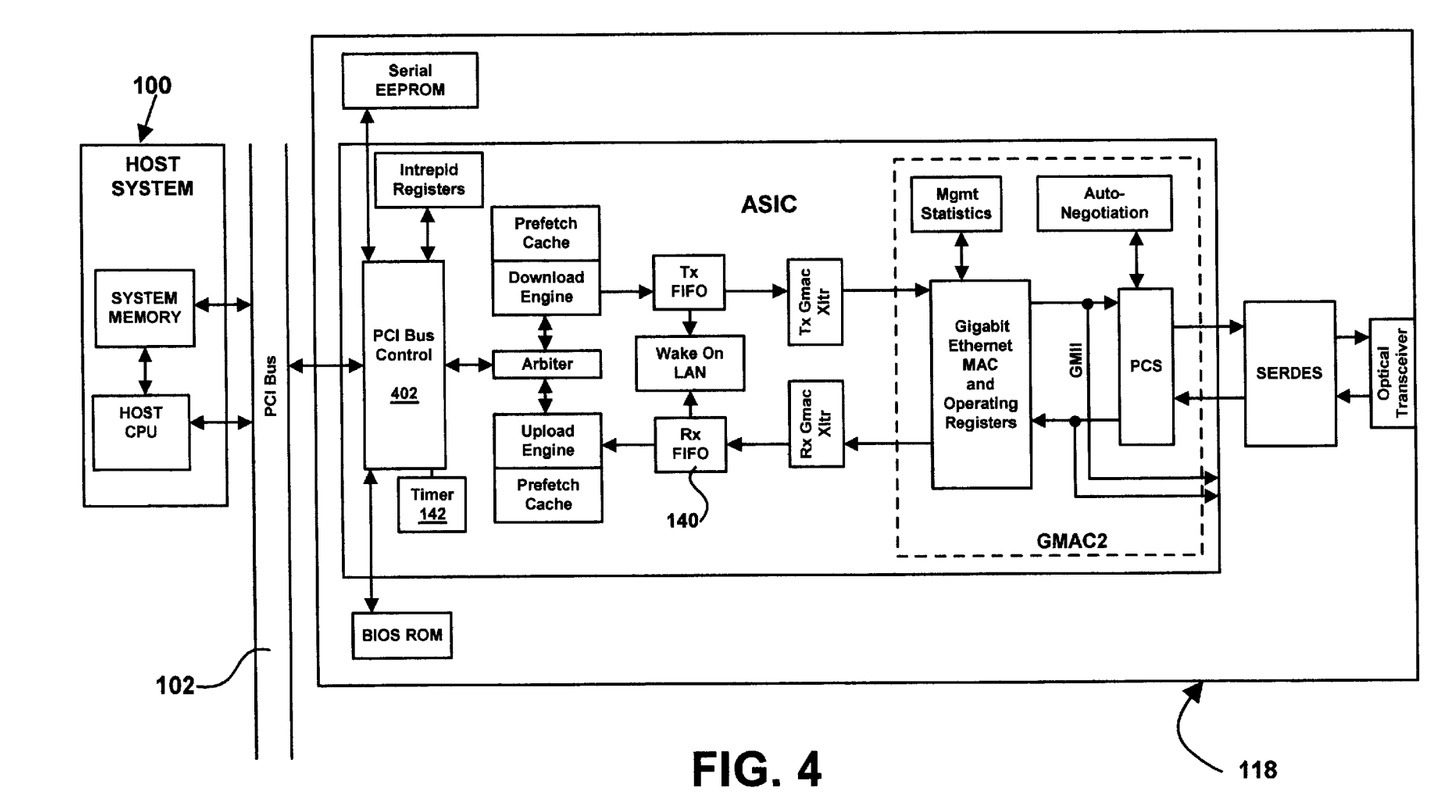
FIG. 4 is a schematic diagram of a host computer system having a network interface card coupled thereto in accordance with one embodiment of the present claimed invention.

Referring again to step 302 of FIG. 3, as mentioned above, network interface card driver 210 of FIG. 2 is adapted to programmably define a duration for a time cycle of a hardware timer 142 disposed on a network interface card 118 both of FIG. 4. In following embodiments, hardware timer 142 of FIG. 4 is, for example, a countdown timer comprised of a counter 500 shown in FIG. 5. As will be described below, counter 500 of the present embodiment is configured to cause the generation of an interrupt signal upon the expiration of the selected time cycle. Although such a counter is shown in the present embodiment, the present invention is also well suited to the use of various other timers well known in the art which are programmable by a peripheral component driver such as, for example, network interface card driver 210.

Figure 5:
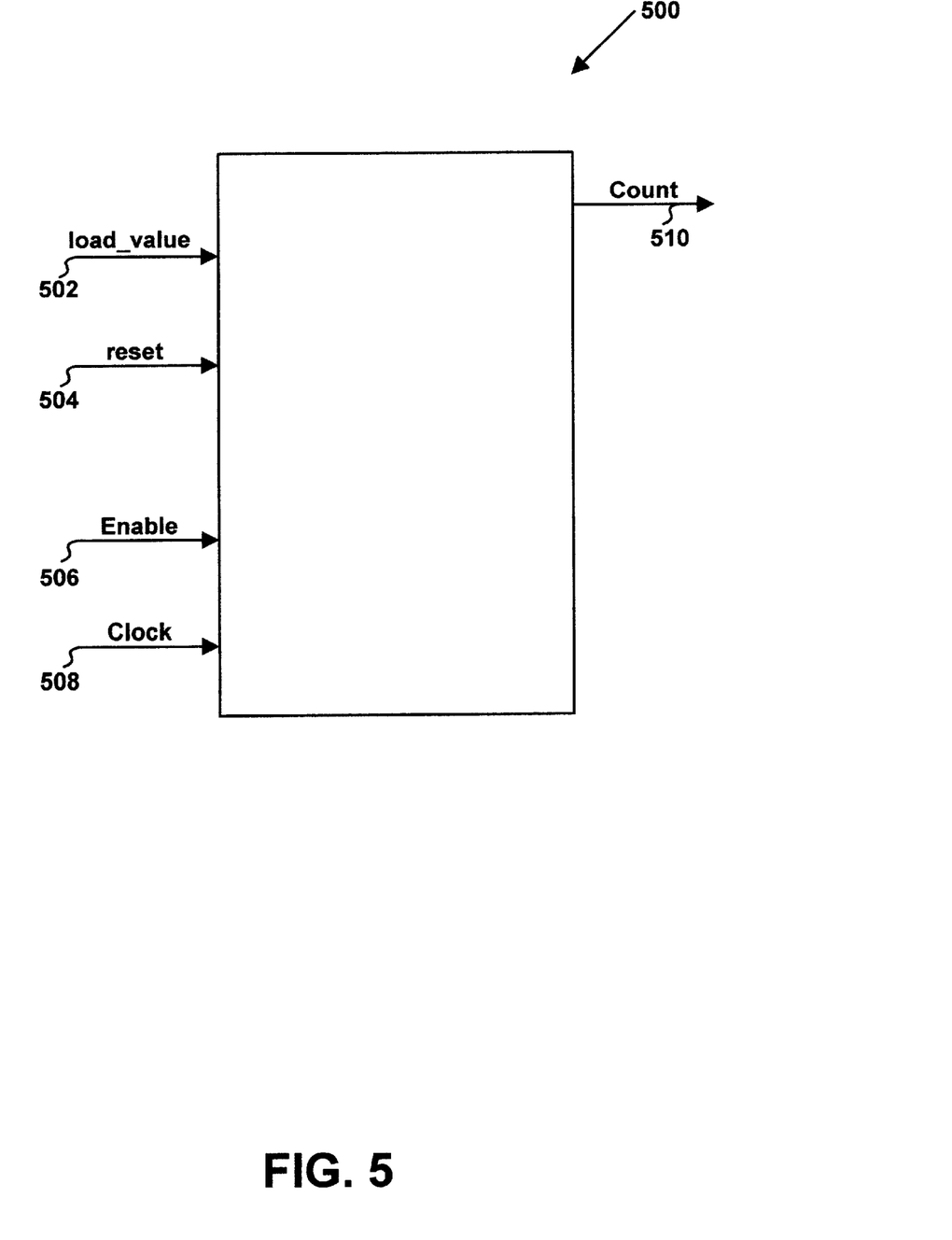
FIG. 5 is a schematic diagram of a counter employed in a hardware timer of a network interface card in accordance with one embodiment of the present claimed invention.

Next, in step 304 of the present embodiment, the present invention implements the duration for the time cycle in counter 500 of FIG. 5 such that counter 500 causes the generation of an interrupt signal upon the expiration of the previously selected time cycle. That is, in the present embodiment hardware timer 142 is electrically coupled to PCI (peripheral component interconnect) bus control logic 402. It will be understood that in the embodiment of FIG. 4, PCI bus control logic 402 is employed to control access to PCI bus 102. Although hardware timer 142 is coupled to PCI bus control logic 402 as shown in FIG. 4, it will be understood that the present invention is also well suited to various other configurations in which hardware timer 142 is coupled to PCI bus control logic 402. Additionally, in the following description of the present embodiments, network interface card 118 generates interrupts for and communicates with host computer 100, both of FIG. 1, via PCI bus 102. Although the present embodiments specifically recite the use of a PCI bus, the present invention is also well suited to an embodiment employing various other busses. That is, the present invention is well suited to an embodiment in which the bus is, for example, a USB (universal serial bus), an ISA (industry standard architecture) bus, a SCSI (small computer systems interface) bus, an IEEE (Institute of Electronics and Electrical Engineers, Inc.) 1394 serial bus, an EISA (extended industry standard architecture) bus, and the like.

Referring still to step 304 of FIG. 3, in the present embodiment, network interface card driver 210 of FIG. 2 implements the duration for the time cycle of hardware timer 142 of FIG. 4 at the value previously received in step 302. More specifically, network interface card driver 210 loads the previously selected value along load_value line 502 of counter 500, both of FIG. 5. Network interface card driver 210 is further adapted to reset and/or enable counter 500 using reset line 504 and enable line 506, respectively. It will further be understood that various other well known input and output lines may be present in counter 500. However, for purposes of clarity, only selected lines are shown in counter 500 of FIG. 5. Additionally, in the present embodiment, a clock signal line 508 transmits a clock signal to counter 500. Upon the expiration of the previously selected value loaded by network interface card driver 210, a count signal is generated along count line 510. In the present embodiment, this count signal is used to initiate the generation of an interrupt signal. Thus, when the duration for the time cycle has expired, a count signal in generated, and, subsequently, an interrupt is generated. In so doing, network interface driver 210 is able to programmably control the duration of a time cycle for hardware timer 142.

At step 306, the present invention utilizes hardware timer 142 with the selected time cycle duration to periodically generate interrupts. That is, upon the generation of the interrupt, network interface card 118 of FIGS. 1, 2, and 4 is serviced by host computer 100 of FIGS. 1 and 4. Thus, in the present invention, network interface card 118 is serviced by host computer 100 at an interval defined by the time duration of the time cycle of hardware timer 142. As a result, various registers and the like, of network interface card 118 will be serviced by host computer 100 on a consistent and timely basis. Unlike, prior art approaches, network interface card 118 is serviced periodically, but it does not pose a threat of continuously asserting interrupts to the CPU of the host computer. Instead, network interface card 118 of the present embodiment optimally minimize CPU utilization.

Referring still to step 306, as yet another advantage of the present invention, even if the operating system of host computer 100 is occupied with another task an interrupt is still generated. As a result, network interface card 118 of the present invention will not have to wait longer than the selected time period to be serviced. Hence, the network interface card 118 of the present invention is no longer subjected to the potential delays associated with conventional software-based polling methods. Furthermore, hardware timer 142 of one embodiment of the present invention is programmable to increments on the order of nanoseconds (i.e. the present embodiment achieves a "granularity" which is on the order of nanoseconds). Specifically, in one embodiment, a clock signal having a frequency of 62.5 MHz is input to counter 500 via clock signal line 508. By selecting the duration for the time cycle of hardware timer 142 to be only one clock cycle, hardware timer 142 will cause an interrupt to be generated once every 16 nanoseconds. It will be understood that the granularity could be made even finer by inputting a faster clock signal onto clock signal line 508. Hence, in the present embodiment also provides a granularity which is extremely valuable in high speed environments such as, for example, Gigabit Ethernet or ATM applications.

With reference still to step 306, the present invention has an additional benefit in that the operating system can "spread" its workload out over several cycles. In the present invention, interrupt generation is not dependent upon the activity of the operating system. Therefore, the operating system can complete its tasks without concern for deleteriously delaying servicing of network interface card 118. Thus, the present invention eliminates a task from the CPU and places the burden of interrupt generation with the network interface card. In so doing, the present invention uses the network interface card to perform tasks with otherwise require the intervention of the CPU of host computer 100. Therefore, the present invention minimizes CPU utilization.

Figure 6:
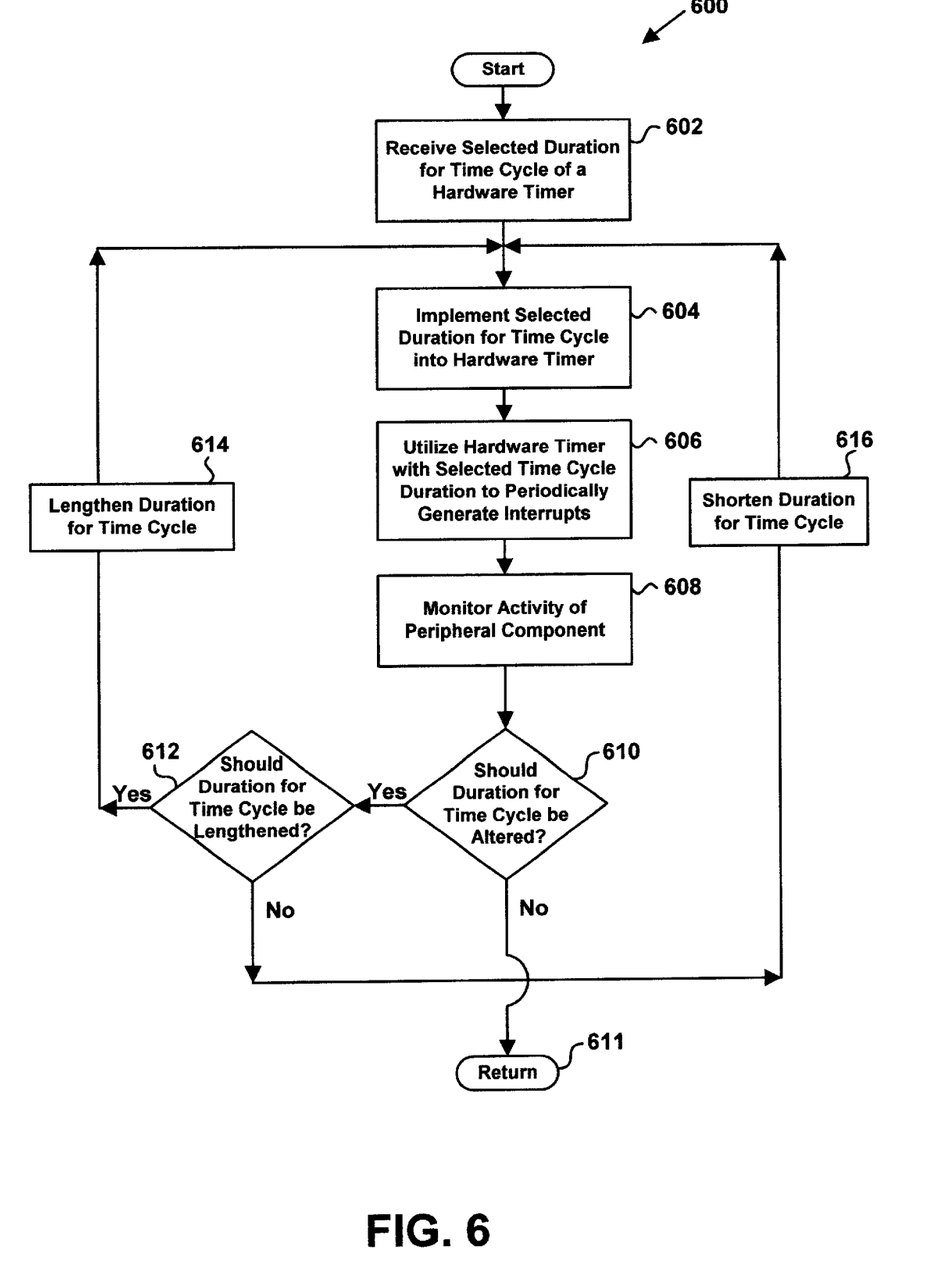
FIG. 6 is a flow chart of steps performed in another implementation of a hardware assisted polling for software drivers method in which the activity of the network interface card is monitored in accordance with one embodiment of the present claimed invention.

With reference now to FIG. 6, a flow chart illustrating steps associated with another embodiment of the present claimed invention is shown. As in the embodiment associated with FIG. 3, in step 602 peripheral component driver 210 of FIG. 2 receives a duration for the time cycle of a hardware timer. More specifically, network interface card driver 210 is adapted to programmably define a duration for a time cycle of hardware timer 142 disposed on a network interface card 118 both of FIG. 1. In the previous embodiment, hardware timer 142 of FIG. 4 is, for example, a countdown timer comprised of a counter 500 shown in FIG. 5. Again, Counter 500 of the present embodiment is configured to cause the generation of an interrupt signal upon the expiration of the selected time cycle.

Next, in step 604 of the present embodiment, the present invention implements the duration for the time cycle in counter 500 of FIG. 5 such that counter 500 causes the generation of an interrupt signal upon the expiration of the previously selected time cycle. That is, network interface card driver 210 loads the previously selected value along load_value line 502 of counter 500, both of FIG. 5. As described above, network interface card driver 210 is further adapted to reset and/or enable counter 500 using reset line 504 and enable line 506, respectively. Upon the expiration of the previously selected value loaded by network interface card driver 210, a count signal is generated along count line 510. In the present embodiment, this count signal is used to initiate the generation of an interrupt signal. Thus, when the duration for the time cycle has expired, a count signal in generated, and, subsequently, an interrupt is generated. In so doing, network interface driver 210 is able to programmably control the duration of a time cycle for hardware timer 142.

At step 606, the present embodiment utilizes hardware timer 142 with the selected time cycle duration to periodically generate interrupts. That is, upon the generation of the interrupt, network interface card 118 of FIGS. 1, 2, and 4 is serviced by host computer 100 of FIGS. 1 and 4. Thus, in the present embodiment, network interface card 118 is serviced by host computer 100 at an interval defined by the time duration of the time cycle of hardware timer 142. As a result, various registers and the like, of network interface card 118 will be serviced by host computer 100 on a consistent and timely basis, without potential delay, and with a granularity not possible in conventional interrupt generation approaches.

Referring now to step 608, in this embodiment of the present invention, the activity of network interface card is monitored. Specifically in this embodiment, network interface card driver 210 of FIG. 2 monitors events of network interface card 118 of FIGS. 1, 2, and 4 which may need to be serviced. For example, upon the generation of an interrupt signal at step 606, network interface card driver 210 checks the status of various registers of network interface card 118. If all of the registers to be potentially serviced are full, then interrupts may need to be generated more frequently to avoid the potential for lost data. Conversely, all of the registers to be potentially serviced are empty, then interrupts may need to be generated less frequently to avoid over utilization of the CPU.

Referring still to step 608, in another example, network interface card driver 210 monitors the activity of network interface card 118 to determine the type of operations being performed by network interface card 118. For example, if network interface card 118 is bursting data therefrom (e.g. transmitting numerous data packets out from network interface card 118 to a network), then network interface card driver 210 will anticipate having lots of data returned thereto (e.g. receiving packets of data back from the network). Thus, in step 608 of the present embodiment, network interface card driver monitors the activity of the network interface card. Furthermore, if, for example, network interface card 118 enters "sleep mode", then network interface card driver 210 will anticipate a much less frequent need to servicing events of network interface card 118.

Referring now to step 610, the present embodiment then determines whether the duration for the time cycle of hardware timer 142 should be altered. That is, if in the example listed above, all of the registers to be potentially serviced are full, or if all of the registers to be potentially serviced are empty, then network interface card driver 210 will alter the duration for the time cycle of the hardware timer. Similarly, if network interface card 118 is bursting data therefrom, then network interface card driver 210 will anticipate having lots of data returned thereto and will alter the duration of the time cycle of hardware timer 142 accordingly. Likewise, if network interface card 118 enters "sleep mode", then network interface card driver 210 will anticipate a much less frequent need to service events of network interface card 118, and will alter the duration of the time cycle of hardware timer 142 accordingly.

If at step 610, network interface card driver 210 determines that the duration for the time cycle of hardware timer 142 should not be altered, then the present embodiment proceeds to step 611. If at step 610, network interface card driver 210 determines that the duration for the time cycle of hardware timer 142 should be altered, then the present embodiment proceeds to step 612.

At step 612, the network interface card driver 210 determines whether the duration for the time cycle of the hardware timer should be increased. If so, the present embodiment proceeds to step 614. As mentioned above, network interface card driver 210 will determine that the duration for the time cycle of the hardware timer should be increased when, for example, network interface card 118 is entering sleep mode. Conversely, network interface card driver 210 will determine that the duration for the time cycle of the hardware timer should be decreased when, for example, all of the registers to be potentially serviced are full, network interface card 118 is bursting data therefrom, and the like.

At step 614 of the present embodiment, network interface card driver 610 of the present embodiment lengthens the duration for the time cycle of hardware timer 142 (i.e. reduces the frequency with which interrupts are generated), by reprogramming the duration for the time cycle of hardware timer 142. Specifically, network interface card driver 210 loads a new "longer" value onto load_value line 502 of counter 500, both of FIG. 5, As a result, network interface card 118 of the present invention generates interrupts less frequently.

If at step 612, network interface card driver 210 determined that the duration for the time cycle of hardware timer 142 should be decreased, the present embodiment proceeds to step 616.

At step 616 of the present embodiment, network interface card driver 610 of the present embodiment shortens the duration for the time cycle of hardware timer 142 (i.e. increases the frequency with which interrupts are generated), by reprogramming the duration for the time cycle of hardware timer 142. Specifically, network interface card driver 210 loads a new "shorter" value onto load_value line 502 of counter 500, both of FIG. 5. As a result, network interface card 118 of the present invention generates interrupts less frequently. Hence, the present embodiment dynamically balances the load on the system by "anticipating" the activity level of network interface card 118. This dynamic balancing of hardware timer 142 optimizes overall system performance. More specifically, in the present embodiment, the frequency with which interrupts are generated is roughly proportional to the nature of traffic seen by network interface card 118.

Additionally, in the present embodiment, network interface card driver 210 is able to reprogram the duration for the time cycle of hardware timer 142 even during a pre-existing countdown. For example, if hardware timer 142 is counting down a 250 millisecond count, network interface card driver 210 can reset hardware timer 142 such that the 250 millisecond countdown is aborted and a new count is immediately selected. In so doing, the present embodiment is able to immediately begin a countdown of, for example, 160 nanoseconds, instead of having to wait for the previously selected 250 millisecond countdown to expire. As a result, the present embodiment can immediately increase the frequency with which interrupts are generated in order to achieve even greater system performance. Similarly, if hardware timer 142 is counting down a 160 nanosecond count, network interface card driver 210 can reset hardware timer 142 such that the 160 nanosecond countdown is aborted and a new count is immediately selected. In so doing, the present embodiment is able to immediately begin a countdown of, for example, 250 milliseconds, instead of having the previously selected 160 nanosecond countdown to expire and generate an unnecessary interrupt. As a result, the present embodiment can immediately decrease the frequency with which interrupts are generated in order to achieve maximum system performance. Therefore, it will be seen that the present invention minimize CPU utilization, maximizes bandwidth and throughput, and makes efficient use of the PCI bus.

Thus, the present invention provides a NIC which precisely and consistently generates interrupts at a predetermined frequency. The present invention also provides a NIC which has the ability to generate interrupts with finer granularity than is possible with conventional software approaches. The present invention further provides a NIC which meets the above-listed needs and which also generates interrupts in a manner which minimizes CPU utilization. Additionally, the present invention provides a NIC attains the above-listed results and which dynamically varies the frequency with which interrupts are generated.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the claims appended hereto and their equivalents.

What is claimed is:

1. A system for programmably controlling hardware generation of interrupts by a network interface card to minimize central processing unit (CPU) utilization and to provide consistent generation of an interrupt signal by said network interface card, said system comprising:

a host computer, said host computer adapted to operate a network interface card driver;

a hardware timer, said hardware time adapted to be programmably controlled by a said network interface card driver; and a network interface card adapted to be removably coupled to said host computer, said network interface card having said hardware timer coupled thereto, said hardware timer adapted to cause the generation of said interrupt signal upon the expiration of a time cycle of said hardware timer such that CPU utilization caused by said interrupt signal is optimally minimized and such that said interrupt signal is generated by said network interface card on a consistent periodic basis defined by a duration of a time cycle of said hardware timer, said interrupt signal not being generated upon the occurrence of a quantity of interrupt events.

2. The system as recited in claim 1 wherein said network interface card driver is adapted to programmably set a desired duration for said time cycle of said hardware timer.

3. The system as recited in claim 1 wherein said network interface card driver is adapted to monitor activity of said network interface card.

4. The system as recited in claim 3 wherein said network interface card driver is further adapted to reprogram the duration for said time cycle of said hardware timer based upon said activity of said network interface card which is monitored by said network interface card driver.

5. The system as recited in claim 1 wherein said hardware timer is adapted to be programmably selected by said network interface card driver such that said time cycle has a granularity on the order of nanoseconds.

6. The system as recited in claim 2 wherein said network interface card driver is further adapted to replace said first duration for said time cycle of said hardware timer with a second duration for said time cycle prior to said expiration of said time cycle of said hardware timer.

7. The system as recited in claim 6 wherein said second duration for said time cycle is shorter than said first duration for said time cycle.

8. The system as recited in claim 6 wherein said second duration for said time cycle is longer than said first duration for said time cycle.

9. A method for programmably controlling hardware generation of interrupts by a network interface card to minimize central processing unit (CPU) utilization and to provide consistent generation of said interrupts by said network interface card, said method comprising the steps of:

a) using a network interface card driver to programmably define a duration for a time cycle of a hardware timer disposed on a network interface card, said hardware timer configured to cause the generation of an interrupt signal upon the expiration of said time cycle, said interrupt signal not being generated upon the occurrence of a quantity of interrupt events; and b) implementing said duration for said time cycle in said hardware timer such that said hardware timer causes the generation of said interrupt signal upon said expiration of said time cycle such that CPU utilization caused by said interrupt signal is optimally minimized, and such that said interrupt signal is generated by said network interface card on a consistent periodic basis defined by a duration of said time cycle of said hardware timer.

10. The method for programmably controlling hardware generation of interrupts by a network interface card as recited in claim 9 wherein step a) comprises using said network interface card driver to programmably define a duration for a time cycle of a hardware timer disposed on a network interface card.

11. The method for programmably controlling hardware generation of interrupts by a network interface card as recited in claim 10 wherein step a) comprises using said network interface card driver to programmably define a duration for a time cycle of a hardware timer disposed on said network interface card.

12. The method for programmably controlling hardware generation of interrupts by a network interface card as recited in claim 9 further comprising the step of:

c) monitoring activity of said network interface card.

13. The method for programmably controlling hardware generation of interrupts by a network interface card as recited in claim 12 further comprising the step of:

d) reprogramming the duration for said time cycle of said hardware timer, using said network interface card driver, based upon said activity of said network interface card which is monitored in step c).

14. The method for programmably controlling hardware generation of interrupts by a network interface card as recited in claim 9 wherein said hardware timer is adapted to be programmably selected by said network interface card driver such that said time cycle has a granularity on the order of nanoseconds.

15. The method for programmably controlling hardware generation of interrupts by a network interface card as recited in claim 9 further comprising the step of:

c) using said network interface card driver to replace said first duration for said time cycle of said hardware timer with a second duration for said time cycle prior to said expiration of said time cycle of said hardware timer.

16. The method for programmably controlling hardware generation of interrupts by a network interface card as recited in step c) of claim 15 wherein said second duration for said time cycle is shorter than said first duration for said time cycle.

17. The method for programmably controlling hardware generation of interrupts by a network interface card as recited in step c) of claim 15 wherein said second duration for said time cycle is longer than said first duration for said time cycle.

18. A method of programmably controlling hardware generation of interrupts by a network interface card to minimize central processing unit (CPU) utilization and to provide consistent generation of said interrupts by said network interface card, said method comprising the steps of:

a) using a network interface card driver to programmably define a duration for a time cycle of a hardware timer disposed on a network interface card, said hardware timer configured to cause the generation of an interrupt signal upon the expiration of said time cycle, said interrupt signal not being generated upon the occurrence of a quantity of interrupt events;

b) implementing said duration for said time cycle in said hardware timer such that said hardware timer causes the generation of said interrupt signal upon said expiration of said time cycle;

c) monitoring activity of said network interface card; and d) reprogramming the duration for said time cycle of said hardware timer, using said network interface card driver, based upon said activity of said network interface card which is monitored in step c) such that CPU utilization caused by said interrupt signal is optimally minimized, and such that said interrupt signal is generated by said network interface card on a consistent periodic basis defined by a duration of said time cycle of said hardware timer.

19. The method for programmably controlling hardware generation of interrupts by a network interface card as recited in claim 18 wherein said hardware timer is adapted to be programmably selected by said network interface card driver such that said time cycle has a granularity on the order of nanoseconds.

20. The method for programmably controlling hardware generation of interrupts by a network interface card as recited in claim 18 further comprising the step of:

e) using said network interface card driver to replace said first duration for said time cycle of said hardware timer with a second duration for said time cycle prior to said expiration of said time cycle of said hardware timer.

21. The computer implemented method for programmably controlling hardware generation of interrupts by a network interface card as recited in step e) of claim 20 wherein said second duration for said time cycle is shorter than said first duration for said time cycle.

22. The computer implemented method for programmably controlling hardware generation of interrupts by a network interface card as recited in step e) of claim 20 wherein said second duration for said time cycle is longer than said first duration for said time cycle.

\* \* \* \* \*